Dec. 7, 1954  R. MacDONALD  2,696,202
FUEL PREHEATING AND TREATING DEVICE
Filed May 21, 1954

RALPH MacDONALD
INVENTOR

BY Theodore E. Simonton
ATTORNEY

United States Patent Office 2,696,202
Patented Dec. 7, 1954

2,696,202

FUEL PREHEATING AND TREATING DEVICE

Ralph MacDonald, Syracuse, N. Y.

Application May 21, 1954, Serial No. 431,317

4 Claims. (Cl. 123—119)

This invention relates to apparatus for using the heated and moisture-laden engine exhaust gases for pre-heating and treating the mixture of air and gasoline which is introduced into the carburetor of internal combustion engines, and relates more particularly to a practical and easily installed device for accomplishing the same.

It is well known that hot exhaust gases, when properly mixed with the fuel, increase the efficiency of operation of internal combustion engines by pre-heating the mixture of gasoline and air, thereby assisting in its vaporization. Furthermore, the addition of moisture and other constituents of the exhaust gases to the fuel mixture results in a smoother running engine, improved idling, conservation of fuel, and elimination of detonation.

The principal object of the invention, therefore, is to provide an economical and easily-installed device, usable as an automobile accessory, for introducing exhaust gases into the air supply to the carburetor so that the warm and moisture laden exhaust gases may be mixed with the fuel as it is introduced into the carburetor.

A further object of the invention is to provide a device adapted to deliver exhaust gases into the carburetor air supply at an easily accessible spot, which device includes means by which the flow of exhaust gases may be conveniently regulated.

A still further object is to provide an apparatus for cleaning and filtering the exhaust gases of an internal combustion motor without undue loss of heat and supplying said gases to the air intake of the engine substantially free of solid particles.

Other objects and advantages will become apparent from the following description and the accompanying drawing, in which.

Figure 1:
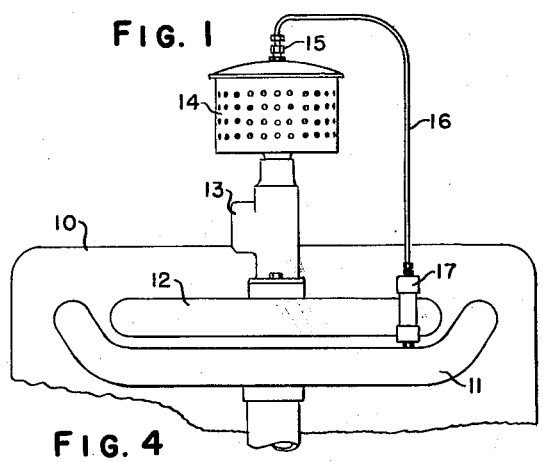
Figure 1 is a diagrammatic view showing a system embodying my invention.

Referring to Figure 1, the internal combustion engine, shown diagrammatically at 10, may be of any conventional design, being provided with the usual cylinders, pistons, valves, etc. Mounted on one side of the engine, as is usual, is an exhaust manifold 11, an intake manifold 12 and a carburetor 13 secured to the latter. Leading to the carburetor, and secured to the air intake thereof, is the air cleaner 14 of the type which is usual to most automobile engines today. Secured to the top of the air cleaner 14 is the tubular adapter 15. An exhaust gas supply pipe 16 leads from the adapter 15 to the exhaust gas filter 17 which, in turn, leads, and is secured, to the exhaust manifold 11.

The air cleaner 14 (Figure 6) is provided with a cover 18 and a central stud 19 which is shown as extending from the carburetor 13 through a hole in the center of the cover 18. A wing nut (not shown) is usually provided by the manufacturer of the air cleaner for the upper threaded end of stud 19 for securing the cover 18 to the cleaner and the cleaner to the carburetor, and such wing nut is discarded when attaching the adapter 15 of this invention. In some air cleaners, the central stud corresponding to the stud 19 has an integral handle at its upper end, and, in such case, it is necessary to install a replacement stud threaded at its upper end.

Figure 4:
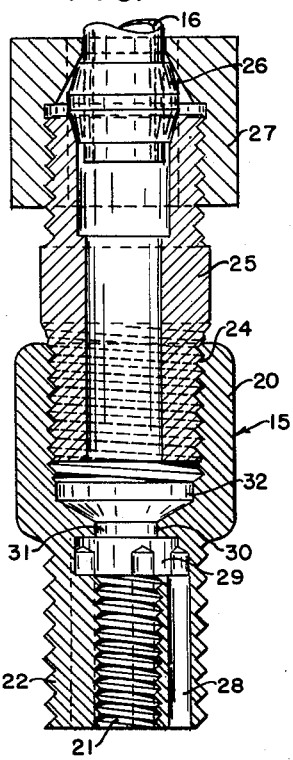
Figure 4 is a greatly enlarged vertical section taken through the adapter for connecting the exhaust gas supply pipe to the air cleaner of an internal combustion engine.
Figure 6:
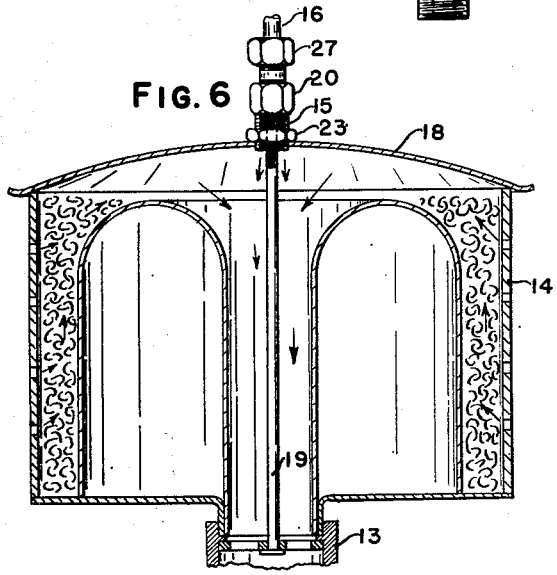
Figure 6 is an enlarged vertical section taken through the air cleaner and showing the adapter secured thereto.

The adapter 15 (Figures 4, 5 and 6) is generally tubular in shape, having a central passage entirely therethrough, but is provided at its upper end with a hexagonal body portion 20 for receiving a wrench. The lower end of the adapter is interiorly threaded at 21 to receive the upper threaded end of the stud 19 and is exteriorly threaded at 22 to receive the lock nut 23. By screwing the adapter 15 on the stud 19 and tightening the lock nut 23 against the cover 18, the adapter is firmly secured to the air cleaner and the latter to the carburetor 13, as shown in Figure 6. The upper end of the adapter 15 is interiorly threaded at 24 to receive a standard nipple 25 which, in turn, is connected to supply pipe 16 by the usual bushing 26 and nut 27.

Figure 5:
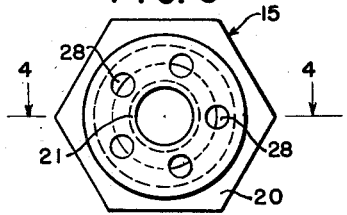
Figure 5 is a bottom plan view of the adapter.

When the adapter 15 is secured to the air cleaner 14 as above described, the stud 19 of course closes the lower end of the central passage through the adapter. A plurality of by-pass passageways 28, here shown as five in number, are therefore drilled or otherwise formed in the annular lower end of the adapter 15 and are spaced about the central passage as best shown in Figure 5. The passageways 28 lead from the bottom of the adapter 15 to the lower end of the chamber 29 forming the middle portion of the central passage through the adapter. An inwardly projecting annular flange 30 on the interior of the adapter forms a constricted portion providing a passage 31 between the chamber 29 and the chamber 32 immediately thereabove which forms the upper portion of the central passage through the adapter. The passage 31 is somewhat larger in diameter than the interior threads 21, so that the stud 19 cannot completely close the passage 31 even though the adapter is screwed so far down on the stud 19 that the stud projects into passage 31.

It will be apparent that the upper end of stud 19 thus cooperates with the adapter 15, and particularly with the passage 31 thereof, to form a valve for metering the flow of exhaust gas from the supply pipe 16 to the air cleaner 14. When the stud 19 extends up within the passage 31, the flow of exhaust gas will be at a minimum. When the upper end of stud 19 is located below the chamber 29, the flow of gas will be at a maximum. Regulation of the exhaust gas flow is therefore easily obtained by turning the adapter 15 on the stud 19 by means of a wrench applied to the hexagonal portion 20 of the adapter. When the correct flow is determined, the adapter 15 is clamped in position by tightening lock nut 23.

Figure 2:
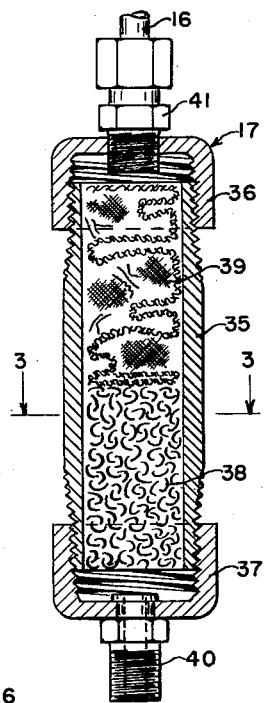
Figure 2 is an enlarged vertical section taken through the exhaust gas filter.
Figure 3:
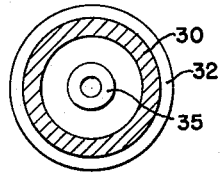
Figure 3 is a sectional view on the line 3—3 of Figure 2.

In Figures 2 and 3, the filter 17 is shown as a short length of pipe 35 threaded at either end to receive pipe caps 36 and 37. The interior of the filter is filled, at the lower end, with a coarse filtering material 38, preferably copper or other metal wool, and, at the top, with a finer filtering material 39, for example, cotton cloth. The outer surface of filter 17 is preferably polished and plated to provide a smooth and reflecting surface to cut to a minimum the radiant heat loss from the hot gases which pass through the filter.

The lower cap 37 has a central hole into which is inserted the nipple 40, the inner end of the nipple being swaged over to form an airtight connection with the cap. The upper cap 36 is drilled and tapped to receive the standard nipple 41 which is connected by the usual bushing and nut to the other end of pipe 16.

The apparatus described above is easily installed. The adapter 15 may be used with any internal combustion engine that is provided with an air cleaner having a central stud for securing the cover thereto. Almost all automobiles today have air cleaners of this type. The central hole in the cover 18 through which the central stud 19 projects is drilled larger to accommodate the lower end of the adapter 15. The adapter 15 is then secured to the air cleaner by screwing it on stud 19 and tightening lock nut 23 as above described. To install the filter, a hole is drilled and tapped in the exhaust manifold and nipple 40 of the filter 17 is secured therein. If it is inconvenient to drill and tap the exhaust manifold, the filter 17 may be attached to the exhaust pipe leading from the manifold to the muffler. Pipe 16 is then secured in the usual manner between nipple 41 of the filter and nipple 25 of the adapter 15.

When the engine is started, hot, moist gases are forced from the exhaust manifold 11 through nipple 40 into the filter 17 where carbon particles and any other solid matter is filtered out. The hot gases then pass through nipple 41, pipe 16 and nipple 25 into the upper chamber 32 of the adapter 15 and from thence through the passage 31, chamber 29 and passageways 28 into the interior of the air cleaner 14, where the hot gases mingle with the currents of air flowing through the air cleaner into the carburetor 13 as indicated by the arrows in Figure 6.

In actual practice, the apparatus described above has been found to result in quicker starting and smoother running of the engine to which it is attached, and particularly in improved idling. Use of the apparatus described above also results in eliminating objectionable detonation and tests show a saving in gas consumption which increases the gas mileage, on the average, two miles to the gallon of gas. Further savings are possible, through use of the apparatus, in that the cheaper grades of gasoline may be satisfactorily used without objectionable detonation.

While there is herein described and in the drawing shown, an illustrative embodiment of the invention, it is to be understood that the invention is not limited thereto, but may comprehend other constructions, arrangements of parts, details and features without departing from the spirit of the invention. I desire to be limited, therefore, only by the scope of the appended claims.

I claim:

1. A fuel pre-heating and treating device adapted for use in conjunction with an internal combustion engine of the type having an exhaust manifold, a carburetor, and an air cleaner leading to said carburetor, said cleaner having a cover and being adapted to be secured to said carburetor by a central stud threaded at its upper end and passing through said cover; said device comprising an adapter having a generally tubular central passage extending entirely therethrough, the lower end portion of said central passage being interiorly threaded to receive the threaded upper end of said stud for securing said adapter to the stud with the lower end of said adapter passing through a hole in said air cleaner cover, said adapter having a plurality of by-pass passageways at its lower end spaced circumferentially about said stud-receiving threaded portion and communicating with said central passage above said threaded portion, said central passage having a constricted portion of slightly greater internal diameter than said threaded portion and located immediately above the upper ends of said passageways, whereby said stud may cooperate with said constricted portion to form a valve for regulating the flow of gases through said adapter, and a pipe connecting the upper end of said central passage to said exhaust manifold, whereby said adapter serves to regulatively admit hot exhaust gases from said exhaust manifold through said air cleaner into said carburetor.

2. The combination as claimed in claim 1 in which said lower end portion of said adapter is exteriorly threaded and is provided with a lock nut for securing said air cleaner and cover to said carburetor in a desired position of adjustment of said adapter on said stud.

3. The combination as claimed in claim 1 in which said pipe is provided with an exhaust gas filter comprising a tube having its central passage filled with successive layers of filtering material and having one end connected to said pipe leading to said adapter and the other end connected to said exhaust manifold, said tube having a polished, smooth outer surface whereby the radiant heat loss from said filter is minimized.

4. The combination as claimed in claim 2 in which said pipe is provided with an exhaust gas filter comprising a tube having its central passage filled with successive layers of filtering material and having one end connected to said pipe leading to said adapter and the other end connected to said exhaust manifold, said tube having a polished, smooth outer surface whereby the radiant heat loss from said filter is minimized.

No references cited.